Nov. 28, 1950 S. MALKE 2,532,238
MECHANICAL UNLOADING AGITATOR
FOR SILOS AND THE LIKE
Filed April 10, 1946 2 Sheets-Sheet 2
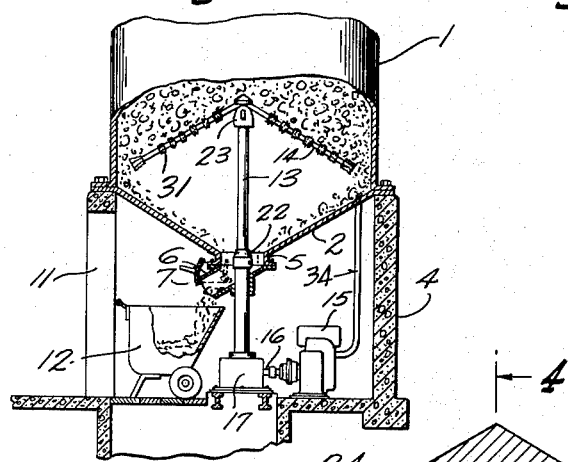
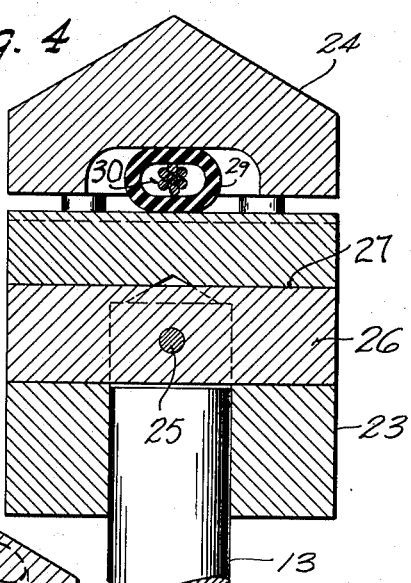
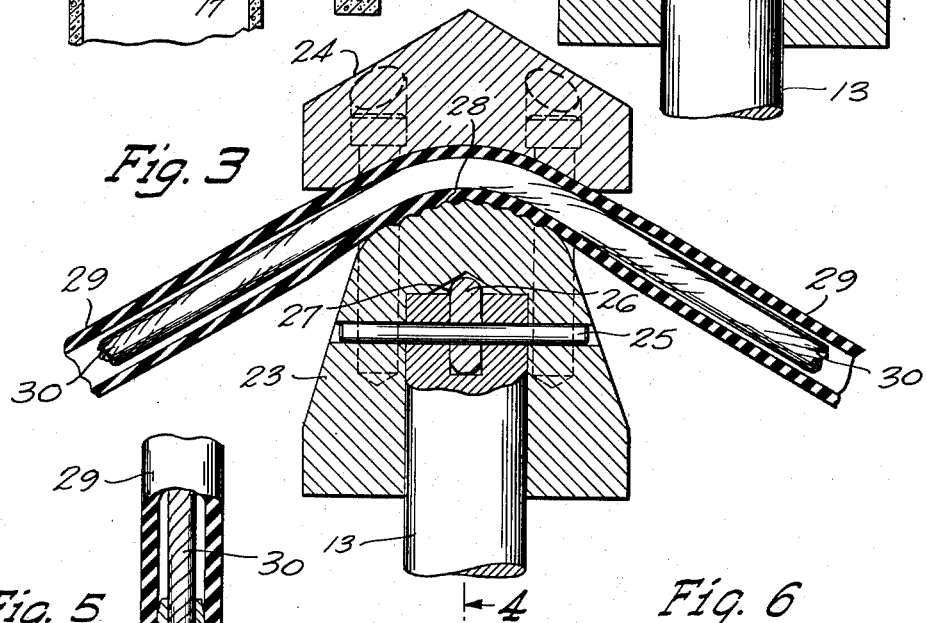
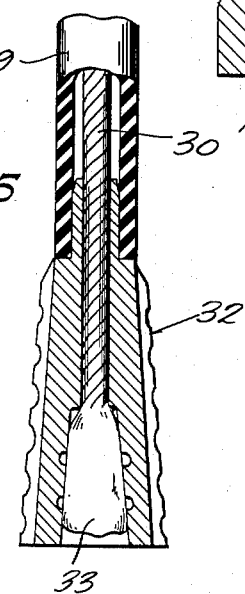
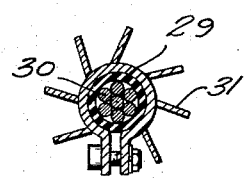
Inventor
Sven Malke
By Olwin C. Andrus
Attorney Patented Nov. 28, 1950

2,532,238

UNITED STATES PATENT OFFICE 2,532,238

MECHANICAL UNLOADING AGITATOR FOR SILOS AND THE LIKE

Sven Malke, Milwaukee, Wis., assignor to A. O. Smith Corporation, Milwaukee, Wis., a corporation of New York Application April 10, 1946, Serial No. 660,919

2 Claims. (Cl. 222—251)

1

This invention relates to a mechanical unloading agitator for silos and the like and has particular relation to an agitator to be employed in the bottom of a substantially airtight silo to dislodge silage for removal therefrom without any substantial entry of air into the silo.

Silage generally has been removed from silos by the operator pitching off the top layers of the storage silage. These layers in the ordinary silo are exposed to the air and if not removed soon enough spoil due to mold growth and deterioration. With the silage exposed to air a considerable amount spoils and has to be thrown away as it is poisonous to stock. This is expensive. In addition considerable hard labor is required to gain access to the top of the silo and to remove the top layers of silage.

The present invention is directed to an unloading agitator that is built into the bottom of a substantially airtight silo and which dislodges silage for removal from the bottom of the silo without excessive entry of air, thus eliminating not only a silo construction requiring the labor of pitching off the top layers of silage but also eliminating injury to the silage by excessive oxygen.

One object of the invention is to provide an unloading agitator for silos and the like that permits unloading of the silage from the bottom of the silo without any substantial entry of air into the silo.

Another object is to provide a bottom unloading agitator for silos and the like which is generally inexpensive and which will last substantially the life of the silo.

A further object is to provide an unloading agitator for silos and the like which is readily operated even by an inexperienced workman.

Another object is to provide a bottom unloader for a silo with flexible arm members to dislodge silage for removal therefrom.

These and other objects of the invention will appear hereinafter in connection with the following description of an embodiment of the invention illustrated in the accompanying drawings in which:

Fig. 2 is a view similar to Figure 1, on a reduced scale with the arms of the agitator swung outwardly by rotation of the agitator shaft;

Fig. 3 is a detail sectional view of the upper

Figure 1:
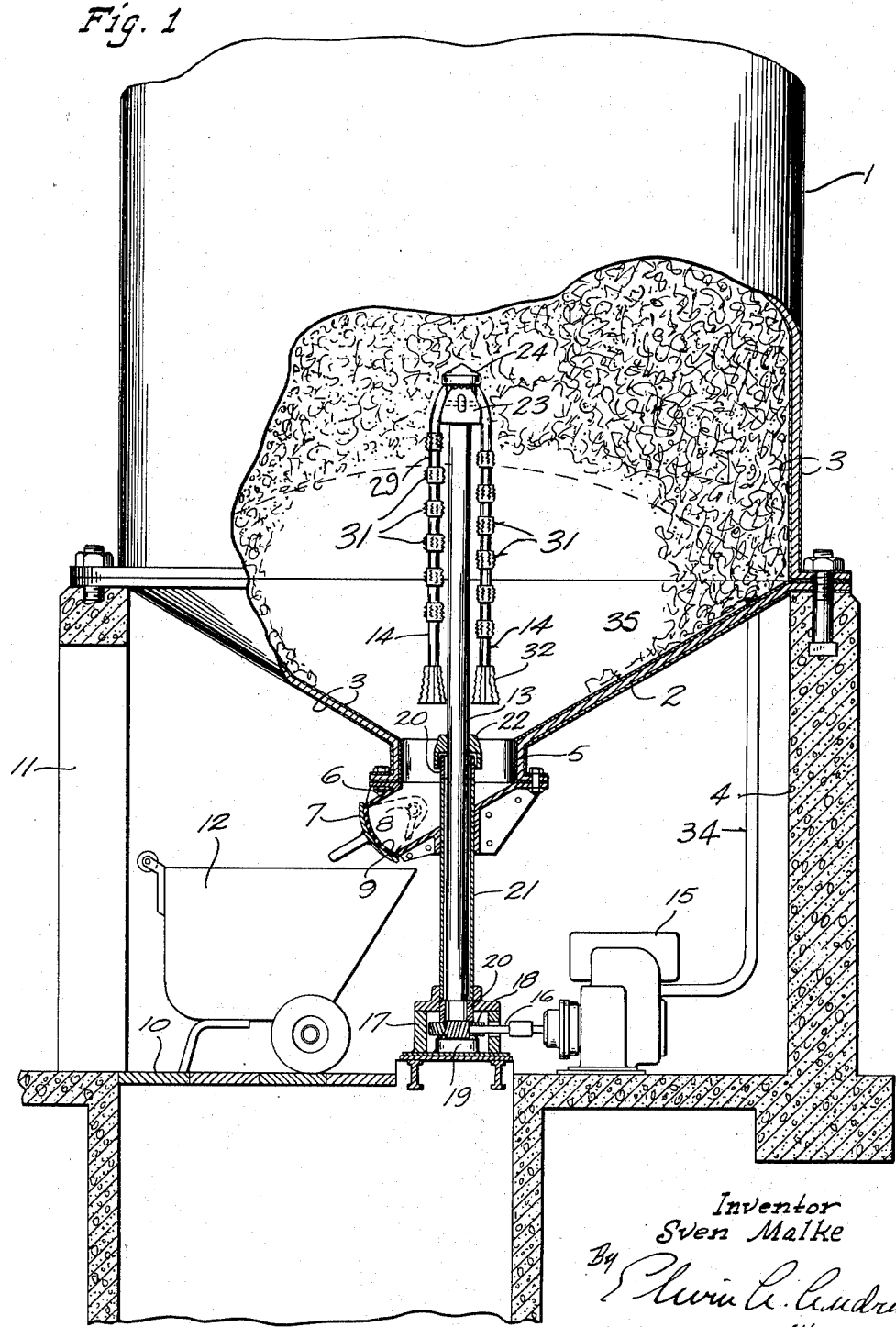
Figure 1 is a longitudinal sectional view, partly in elevation, of the lower portion of a silo with the agitator shaft in non-rotating position and the arms of the agitator hanging down parallel thereto.

2 end of the drive shaft and showing a portion of the rotating arms;

Fig. 4 is a section taken on line 4—4 of Fig. 3;

Fig. 5 is a detail section of the end of one of the agitator arms; and

Fig. 6 is a cross-section of one of the serrated rings on a flexible arm.

The drawings show a silo comprising in general the shell 1 provided with a cone shaped bottom section 2 and both of which are formed of metal coated with ceramic enamel 3 and bolted or otherwise secured to the foundation 4.

The shell 1 is cylindrical and extends upwardly from the foundation any suitable height. The top of shell 1 is closed by a roof section, not shown.

The cone section 2 has a central opening which is surrounded by the circular neck 5. The unloading chute 6 is suitably secured to neck 5 and extends diagonally downward therefrom to carry off the silage stored within the silo after the same has been dislodged.

Chute 6 is closed against the entry of air, except during unloading, by the door 7 which is hinged to the side walls thereof. Door 7 may be provided with an arrangement such as the eccentric arm and pivot 8 to tighten the door against the gasket material 9 which is disposed between the door and chute, to insure an airtight closure of the chute. Door 7 is opened or closed by the operator standing within the foundation 4 on the floor 10.

Floor 10 may be constructed in a number of different ways but should be provided in part with a removable section covering a pit or the like to permit removal downwardly from the bottom of the silo of the agitating device which will be described hereinafter. Access to the inside of the foundation 4 is gained through the side opening 11. The operator enters the foundation onto floor 10 through opening 11 and the opening is large enough to accommodate a cart, such as the cart 12, to catch and carry off silage flowing from chute 6.

The unloading agitator of the invention has a vertical agitator shaft 13 that extends from substantially the floor 10 of the foundation centrally upwardly through the wall of chute 6 and neck 5 to a line substantially above cone 2.

Shaft 13 supports the flexible arms 14 at the upper end thereof. The gasoline engine 15 is located outside the silo shell, preferably on floor 10 of foundation 4, and is provided to drive shaft 13 and rotate arms 14 around the silo to dislodge silage for unloading. The shaft 13 may also be rotated by an electric motor or the like.

The drive shaft 16 of gasoline engine 15 extends horizontally from engine 15 and into the gear box 17 which is supported on floor 10. The lower end of shaft 13 is driven from drive shaft 16 by the gears 18 in box 17. The bearing plate 19 is provided to support the assembly within the gear box.

Agitator shaft 13 rotates within the upper and lower bushings 20 and is also supported for rotation by the bearing sleeve 21 which extends between the respective bushings 20 and centrally through the wall of chute 6 and the neck 5 of cone member 2.

The agitator shaft 13 extends upwardly within the silo from bearing sleeve 21 to within the normal bridging zone of the silage stored within the silo, as generally indicated by the dotted line in the drawings.

The arms 14, which are preferably of one piece construction, are clamped between the block 23 on the upper end of shaft 13 and the cap 24 which is bolted to block 23. Block 23 is secured to shaft 13 by pin 25 and is held against turning by the key 26. Key 26 is a flat strip of metal and extends horizontally through the slot 27 in the upper end of shaft 13. Pin 25 besides securing block 23 to shaft 13 also locks key 26 in place to prevent dislodgement upon rotation.

The block 23 is serrated at the upper end 28 in the area engaging arms 14 to prevent the arms from slipping between the block and cap 24 when the arms are rotating.

The arms 14 are formed of an outer casing of rubber 29 and the stranded metal cable 30 which is housed within the rubber casing. Clearance is shown in the drawings between the cable 30 and casing 29. It may be preferable, however, to vulcanize the rubber casing to cable 30 or otherwise provide the same without clearance therebetween.

Arms 14 are each provided with the teeth 31 formed integral with ring members clamped to the respective arms and spaced from each other along each arm. The rings on one arm are offset from the rings on the other arm so that the teeth 31 will each bite into the silage along different paths. Fig. 6 illustrates a ring clamped to an arm 14. The teeth on each ring may be formed by punching the same outwardly from the sheet metal of the ring or may be strips welded to a central ring.

Each arm 14 is provided at the extreme outer end with the serrated end piece 32. The ends of cable 30 extend into the end pieces 32 and are anchored therein with lead 33 or the like.

When shaft 13 is not rotated, arms 14 hang down parallel to the shaft as shown in Figure 1. Upon rotation by shaft 13, as shown in Fig. 2, the arms swing outwardly under centrifugal force toward the shell 1 of the silo to dislodge the stored silage. The arms are of a length to provide clearance between the same and shell 1 so that enamel coating 3 will not be injured.

In operation, after the silo is filled with fodder the door 7 of chute 6 is closed and the silo stands substantially airtight to eliminate mold growth and deterioration of the silage.

When it is desired to remove silage, door 7 of chute 6 is opened, the operator starts gasoline engine 15 and shaft 13 is revolved therefrom through drive shaft 16 and gears 18. As shaft 13 revolves, arms 14 swing outwardly under centrifugal force into the silage and dislodge the same to fall or flow out of chute 6 and into the cart 12 to be transported to the stock. After removal of sufficient silage the door 7 is closed against entry of air and tightened into place by operation of eccentric arm 8.

Oxygen which may have entered when chute 6 was open is purged from the silo. For this purpose the engine 15 is declutched from shaft 16 and operated for a short time to drive combustion gases into the silo through a suitable piping connection 34 from the engine exhaust, in the same manner as disclosed and claimed in the copending application of Wesley G. Martin, entitled Silo, Serial No. 598,044, and assigned to the assignee of the present invention.

After silage has been removed several times it has been found that cavitation occurs in the silage within the bottom of the silo as designated in Figure 1 with the numeral 35, since the silage tends to bridge over in an arc within a zone slightly above cone 2 as generally indicated by the dotted line.

The upper end portion of shaft 13, however, is disposed within the silage bridging zone and the arms 14 upon rotation bite into the lower layers of the bridging zone and loosen and dislodge sufficient silage for the needs of the operator.

After a short period it has been found that the silage mass moves downwardly within the silo and fresh layers of silage are available within the bridging zone which are accessible for removal by arms 14.

Under the invention the silage is removed from the bottom of the silo without any injury to the silage by excessive entry of air.

Various embodiments of the invention may be employed within the scope of the accompanying claims.

I claim:

1. An unloading agitator for dislodging silage stored within a silo, comprising a vertical agitator shaft extending upwardly within the bottom of the silo and rotated by driving means connected thereto and disposed outside the silo, a block member secured to the top of said shaft, a cap secured to said block, flexible arms clamped between said block and cap and comprising a flexible cable extending transversely of the shaft and having free ends disposed to swing outwardly under centrifugal force when the arms are rotated by said driven shaft to dislodge the stored silage, and teethed rings secured to the arms and spaced from each other along each arm and offset from the rings of the adjacent arm to bite into the stored silage along different paths and more adequately dislodge the same.

2. An unloading agitator for dislodging silage stored within a silo, comprising a vertical agitator shaft extending upwardly within the bottom of the silo and rotated by driving means connected thereto and disposed outside the silo, a block member secured to the top of said shaft, a cap secured to said block, arm members formed of a flexible cable extending transversely of said shaft and having free ends, said cable being clamped between said block and cap and disposed to swing the free ends thereof outwardly under centrifugal force to dislodge silage within the silo when the arm members are rotated by said vertical shaft driven by the driving means, teethed rings secured to the arms and spaced from each other along each arm and offset from the rings of the adjacent arm to bite into the stored silage along different paths upon rotation of the arms, and serrated end pieces secured to the free ends of the arms for additional dislodgment of silage.

SVEN MALKE.

REFERENCES CITED

The following references are of record in the file of this patent:

UNITED STATES PATENTS

| Number | Name | Date |
|---|---|---|
| 1,167,536 | Tokheim | Jan. 11, 1916 |
| 1,543,525 | Shiras | June 23, 1925 |
| 1,676,389 | Fletcher | July 10, 1928 |
| 1,682,735 | Bergerioux | Sept. 4, 1928 |
| 1,734,632 | Merrill | Nov. 5, 1929 |
| 2,228,421 | Taylor | Jan. 14, 1941 |